No. 743,568. PATENTED NOV. 10, 1903.
W. RUBIN.
MECHANISM FOR PREPARING AND APPLYING SOLDER TO VESSELS.
APPLICATION FILED JAN. 7, 1903.
NO MODEL. 4 SHEETS—SHEET 2.

No. 743,568. PATENTED NOV. 10, 1903.
W. RUBIN.
MECHANISM FOR PREPARING AND APPLYING SOLDER TO VESSELS.
APPLICATION FILED JAN. 7, 1903.
NO MODEL. 4 SHEETS—SHEET 3.
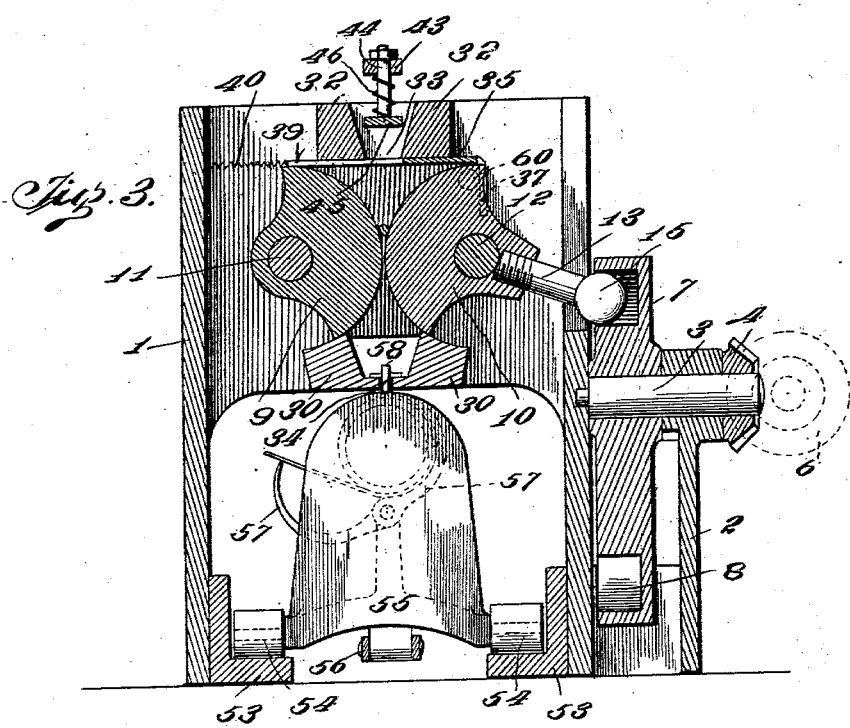
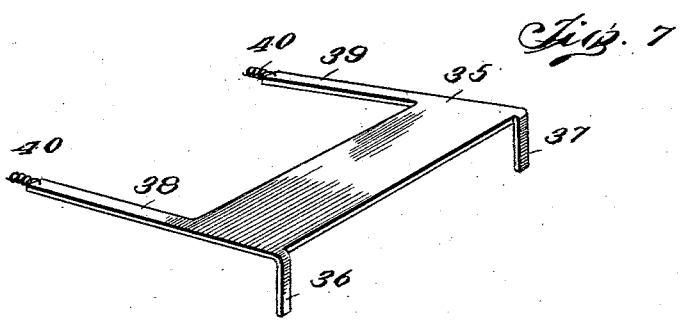

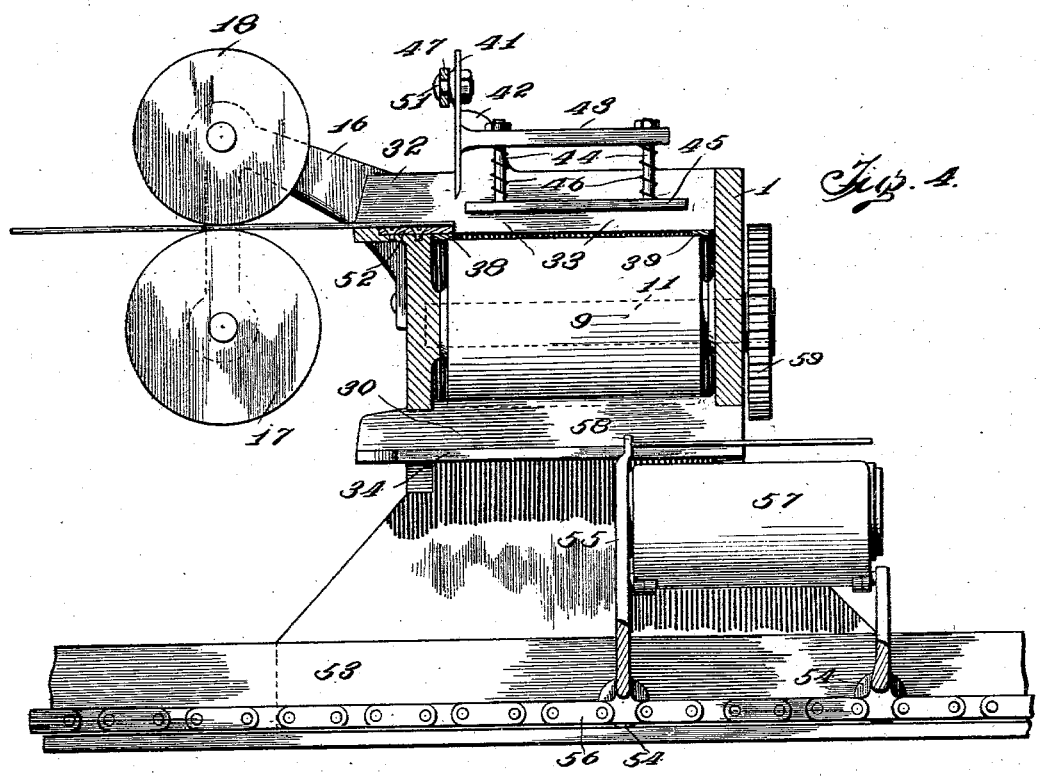
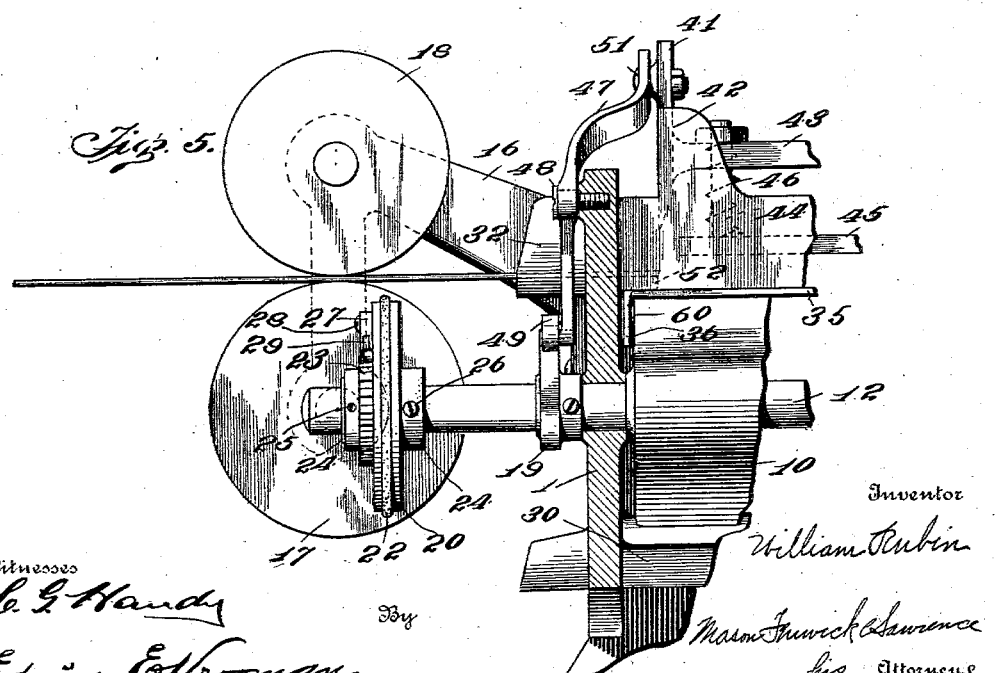

No. 743,568.

Patented November 10, 1903.

UNITED STATES PATENT OFFICE.

WILLIAM RUBIN, OF SOUTH OMAHA, NEBRASKA.

MECHANISM FOR PREPARING AND APPLYING SOLDER TO VESSELS.

SPECIFICATION forming part of Letters Patent No. 743,568, dated November 10, 1903.

Application filed January 7, 1903. Serial No. 138,146. (No model.)

*To all whom it may concern:*

Be it known that I, WILLIAM RUBIN, a citizen of the United States, residing at South Omaha, in the county of Douglas and State of Nebraska, have invented certain new and useful Improvements in Mechanism for Preparing and Applying Solder to Vessels; and I do hereby declare the following to be a full, clear, and exact description of the invention, such as will enable others skilled in the art to which it appertains to make and use the same.

This invention relates to improvements in mechanism for preparing and applying solder to vessels.

The object of the device is the preparing of solder and the applying of the same to the seam of a vessel.

The invention consists in means for taking a suitable quantity of solder and shaping the same, so that the solder may be readily applied to the seam of a vessel.

It also consists in mechanism for cutting off bars or rods of solder in suitable lengths and flattening the same for applying it to the seam of a vessel.

The invention further consists in means for forming a suitable piece of solder into a perfectly straight piece and flattening the same, so that it may be properly applied to the seam of a vessel.

The invention consists in the combination of parts and novel construction, as is hereinafter more fully described, illustrated in the accompanying drawings, and more particularly pointed out in the claims hereto appended.

Figure 1:
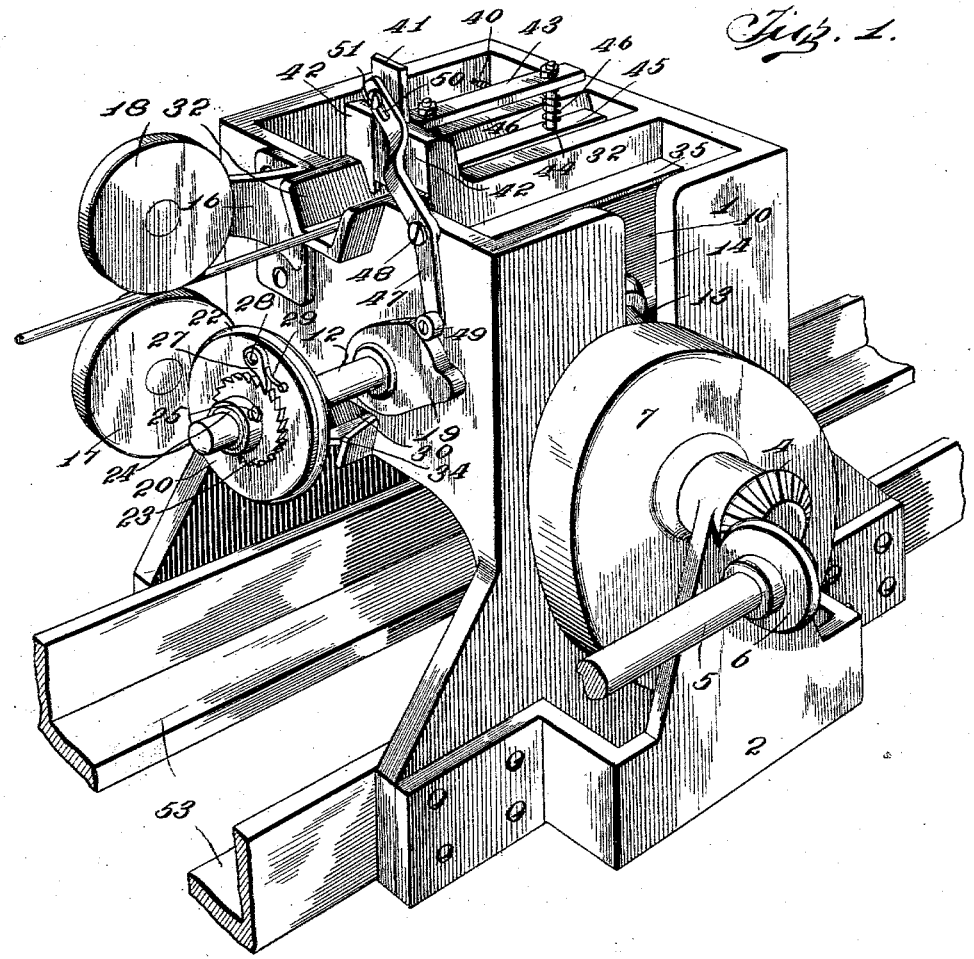
Figure 2:
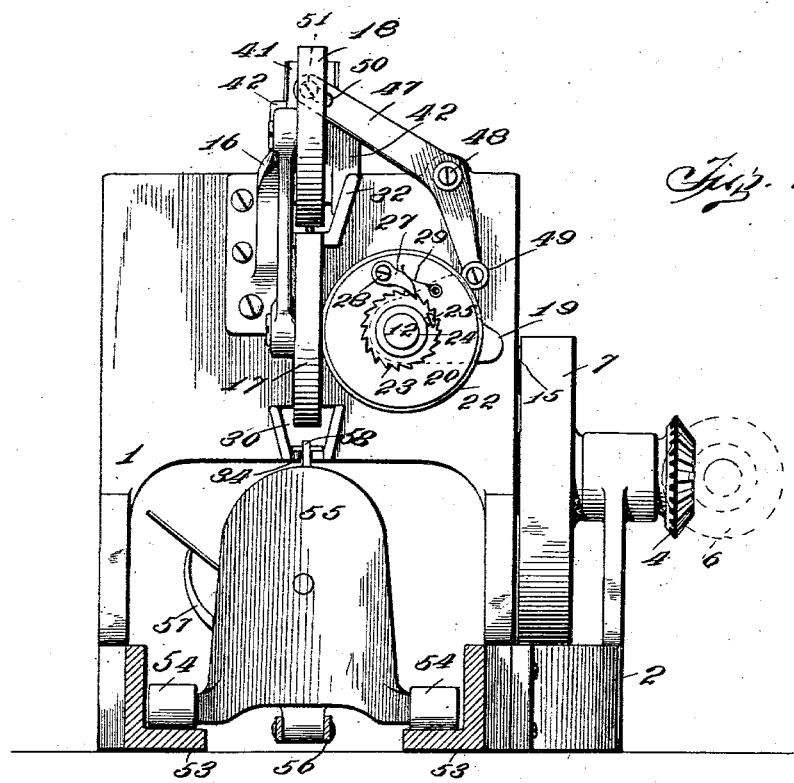
Figure 6:
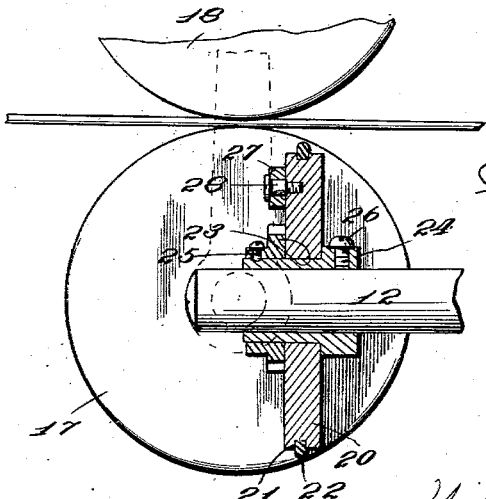

In the drawings, Figure 1 is a perspective view of a machine embodying my invention. Fig. 2 is a front elevation of the same. Fig. 3 is a vertical cross-sectional view of the same through the central portion of the machine. Fig. 4 is a central longitudinal section of the machine, parts being shown in elevation. Fig. 5 is a detail sectional view through one end of the machine, showing the feed-rolls employed and the mechanism for operating the solder-cutter. Fig. 6 is a detail view, partially in section and partly in elevation, of means for controlling the speed of the feed mechanism. Fig. 7 is a detail perspective view of the slide for controlling the admission of solder to the machine.

Like numerals of reference indicate corresponding parts throughout all the figures of the drawings.

The invention as embodied in a practical form is provided with a casing or frame 1, within which the greater portion of the operating mechanism is inclosed. The mechanism within the frame 1 receives its motion from a power-shaft 5, which extends in suitable proximity to the frame 1, and carries a beveled gear 4 upon the shaft 3. The shaft 3 is journaled at one end in a bearing formed in the casing 1, while within its upper end it is supported by a journal in a bracket 2, secured to the outer face of the casing 1.

Between the casing 1 and the bracket 2 is a cam 7, which is secured to the shaft 3, from which it receives motion. The cam 7 is formed with a suitable cammed surface which operates the mechanism carried by the casing 1. The cammed surface is preferably made in the form of a groove 8, said groove being located upon the inner face of said cam 7. Two parallel segments of cylinders 9 and 10 are journaled upon the casing 1 by means of suitable shafts 11 and 12. To the cam 7 is secured an arm 13, which extends through the slot 14 in the casing 1. The arm 13 carries at its outer end an operating-abutment for engaging the groove 8 of the cam 7, and this operating-abutment is preferably made in the form of a ball with a spherical end portion. The rotation of the cam 7 will thus be seen to communicate through the arm 13 a rocking movement to the segment 10. A corresponding movement is imparted to the opposing segment 9 by means of intermeshing gear-wheels 59. The shafts 11 and 12 of the segments 9 and 10 preferably project through the casing 1, and the gear-wheels 59 are keyed thereto outside of the casing. Thus when the segment 10 is actuated the segment 9 will be correspondingly moved. The opposing faces of the segments 9 and 10 approximate each other quite closely and are spread apart the proper distance to make the solder which is passed through them of the desired thickness for the purpose required. For feeding the solder to the machine I provide a suitable mechanism mounted upon the frame 1. Two feed-rollers 17 and 18 are journaled upon a bracket 16. The rollers 17 and 18 are preferably arranged one above the other in a vertical plane, so that their peripheries will approximate each other a suitable distance for feeding solder between them. The shaft 12 of the segment 10 is at one end extended beyond the casing of the machine, as illustrated in Figs. 1 and 5. Keyed upon this shaft 12 and abutting the outside of the casing 1 of the machine is a cam 19 for operating the cut-off mechanism, as will be hereinafter described. To the outer end of the shaft 12 is adjustably secured a friction-roll 20. The friction-roll 20 is provided with a peripheral groove 21, which is adapted to receive a ring or tire 22, of frictional material, which is adapted to bear upon the face of one of the feed-rolls. The roll 20 is adjustably mounted upon the outer end of the shaft 12 and for this purpose is provided with an elongated adjustable hub 24. A ratchet 23 is secured upon the adjustable sleeve 24 and is caused to abut the friction-wheel 20 by suitable means—as, for instance, a set-screw 25. The adjustable sleeve of the friction-wheel 20 is provided with suitable means, preferably a set-screw 26, for the adjusting of the said wheel upon the shaft 12. To the friction-wheel 20 is secured a pawl 27 by means of a screw 28. The pawl 27 is forced into engagement with the ratchet 23 by means of a spring 29. It will be seen that by adjusting the friction-wheel 20 back and forth upon the shaft 12 its frictional edge will be made to operate upon the surface of one of the feed-rolls 17 at points nearer to its axis or farther therefrom, as may be required to vary the speed of the movement imparted to said feed-rolls, and thus the length of a piece of solder which may be fed to the machine between the rolls 17 and 18 is controlled, being made longer or shorter, as may be required.

The solder which is fed from the feed-rolls is received by a slotted trough 32, mounted upon the upper part of the frame 1. The trough 32 is arranged immediately above the rocking segments 9 and 10, its slotted portion 33 being arranged in line with the space between the segments.

The solder is fed in the form of a wire or bar to the machine by the rolls 17 and 18, as hereinafter intimated, and passes inwardly through the trough 32 until a sufficient length of said wire to solder the receptacle to be operated upon projects above the slot 33 in the bottom of said trough, at which time the solder will be cut by cutting mechanism suspended just above the trough. The cutting mechanism consists in a reciprocating knife 41, which is guided in its vertical movement by engaging at its edges guiding grooves or bearings formed in the opposing faces of upwardly-extending projections 42 upon each side of the trough 32. The knife 41 is reciprocated by means of a lever 47, which is fulcrumed at 48 upon the front wall of the casing 1 and is provided with an elongated slot 50 at one end which engages a pin or screw 51, secured to the knife. The other end of the lever 47 is provided with an antifriction-roll 49, which engages the periphery of the cam 19, which is carried by the shaft 12. The cam 19 is so shaped that the knife will be held in its raised position until a suitable amount of solder has been fed into the trough, and the cam will so act upon the lever 47 as to cause the knife to descend and cut off the desired piece of solder. Coöperating with the knife 41 is a plate 52, preferably of hard material, such as steel, which is located in the depressed portion or recess formed in the bottom of the trough 32. The inner edge of the plate 52 coincides with the plane of the front face of the knife, so that the knife will be supported in performing the cutting operation upon the solder. Means is also provided in connection with the cutting apparatus for delivering the sticks or bars of solder in a straight condition to the flattening segmental rolls. A portion of this means is carried by the knife 41 and consists in an arm 43, projecting rearwardly therefrom for the greater length of the trough and provided with perforations near its ends. Projecting through these perforations are vertical standards or bolts 44, which carry at their lower end an elongated plate 45. The plate 45 is kept normally in its lowered position by springs 46, surrounding the bolts 44. The bolts 44 are limited in their downward movement by nuts upon their upper ends. Another part of this solder-delivering mechanism consists of a plate 35. The plate 35 rests upon the upper edges of the rocking cylindrical segments 9 and 10 and is formed at one of its ends with laterally-projecting arms 38 and 39. These arms are connected with one of the walls of the casing 1 by means of springs 40, which tend to draw the plate 35 toward the side of the casing, and thereby close the slot 33 in the bottom of the trough 32. The movement of the plate 35 in connection with the springs 40 is limited and controlled by downwardly-projecting arms 36 and 37, which engage projections or pins 60 extending outwardly from the opposite ends of the segmental roller 10. These pins are preferably located at the upper edge of said roller. When the arm 13 is in its highest position, the upper edges of the segmental roll will be comparatively close together, and the pins 60 will permit the plate 35 to close the slot 33. While in this position the solder is cut and deposited in the trough 32. The descent of the knife after performing this operation causes the spring-pressed plate 45 to engage and force the solder cut off against the plate 35. As the segment 10 is rocked upwardly again the plate 35 will be gradually withdrawn from beneath the plate 45, tending to roll the piece of solder between the said plates and insure the straightening of said solder. Of course as soon as the plate 35 is retracted from beneath the slot 33 the solder will fall between the rocking segmental rolls.

Below the rocking segments 9 and 10 I provide suitable means for receiving the flattened solder as it drops from the flattening segments, the said means holding the solder so that it can be taken and properly applied to the seam of a receptacle which is to be soldered. This means consists in a trough 30, the upper side walls of which project in close proximity to the segments 9 and 10. The upper surfaces of these side walls are preferably concave, so as to fit snugly the outer convex surfaces of the flattening-segments 9 and 10 as they rock back and forth. The trough is really formed in two parts with a narrow slot between them, the bottom of the trough being formed by ledges projecting inwardly from each side thereof. As the solder in its flattened condition leaves the segments 9 and 10 it will drop upon the bottom ledges of the trough 30 ready to be applied to a receptacle.

In order to apply the solder to the seam of a can or other receptacle, a receptacle-carrier is passed through the bottom of the casing 1. This carrier preferably consists in any suitable endless conveyer or chain 56, which carries at intervals vessel-holders 55. These vessel-holders are formed with laterally-projecting portions which have antifriction-rolls 54 engaging guiding-tracks 53, secured to the casing. The tracks pass through the lower portion of the casing 1, and the vessel-carriers 55 are so constructed as to carry vessels or cans quite closely beneath the trough 30. The holders 55 are also provided with projections or studs 58, which extend upwardly therefrom and are made sufficiently narrow to pass freely through the slot in the bottom of the trough 30. The studs 58 project a sufficient distance into the trough to engage the end of the solder which rests in the bottom thereof. As the endless carrier 56 proceeds on its travel through the machine the stud 58 will push the flattened piece of solder longitudinally out of the trough 30 through the open end thereof and permit the same to fall upon the vessel or can carried by the holder 55.

By this mechanism the solder can be deposited either upon the outside of the seam of a vessel or can or it can be deposited between the edges of the blank forming the body of the can. The whole manner of handling the solder in this machine is especially adapted for this latter purpose, since by making the holder 55 in the shape of a can-form having, as illustrated in dotted lines in Fig. 3, pivoted jaws 57, one of which holds a vessel-blank with one edge immediately beneath the groove of the trough 30, while the other arm permits the other edge of the blank to project upwardly, the solder may be deposited upon the first edge, and then the other edge can be brought on top of the same by the action of the arm 57. In this manner the solder can be placed in the best position for easily and quickly securing the edges of a vessel-blank in a secure position.

The operation of the mechanism for preparing and feeding solder to vessels or cans is as follows: Solder in the form of sticks, rods, or wire is fed between the rolls 17 and 18 into the trough 32, where it is cut off in suitable lengths by the knife 41. The piece thus cut is caught between the plate 45 and the plate 35 and rolled sufficiently to thoroughly straighten the same by the retraction of the plate 35, after which the straightened piece of solder falls between the rocking segments 9 and 10. As these segments are actuated by their cams they will flatten the piece of solder and drop the same into the trough 30 beneath them. The flattened piece of solder will then be engaged by the stud 58 and deposited upon the vessel or can in the holder 55. Heat may be applied to the solder in any suitable or desired manner for causing the same to thoroughly secure the edges of the vessel-blank together. The length of the piece of solder cut off is controlled by the speed with which the feeding-rolls 17 and 18 are driven, and this is in turn controlled by the adjustment of the friction disk or wheel 20 upon the shaft 12. It will be observed that the disk 20 does not have a continuous movement, since the shaft 12, which carries the same, is a rock-shaft and not a rotating shaft. Because of the ratchet connection between the disk or friction-wheel 20 and the shaft 12 the said wheel will only be forced in one direction, but will remain inactive when the segments are operating upon the piece of solder which has already been cut and deposited between them after flattening the same. When the segments are returned again in position for receiving a new piece of solder, the disk 20 is actuated for feeding a new piece of solder into the machine.

The mechanism will be seen to be adapted for not only cutting off pieces of solder and flattening the same, but for regulating the length of the solder and insuring that it shall be in a straight condition for the action of the flattening-segments. The manner of applying the solder to the seam of a can or vessel is also quite simple and is not likely to get out of order. It will be evident, of course, that solder may be applied to the blank of any kind of a vessel, whether it be cylindrical, elliptical, rectangular, or provided with flat sides or any other shape.

Of course it will be evident that minor changes in the arrangement and construction of the apparatus may be made without departing in the least from the spirit of the invention.

Having thus fully described my invention, what I claim as new, and desire to secure by Letters Patent, is—

1. A mechanism for feeding solder for use on vessels, cans or the like comprising means for delivering the solder in suitable lengths to flattening-segments and means for rocking the segments for crushing or flattening the solder.

2. A solder-feeding mechanism comprising means for delivering solder in suitable lengths to a flattening mechanism, and rocking segments for receiving said solder and flattening the same, so that it may be readily applied to vessels, substantially as described.

3. A solder-feeding mechanism comprising means for cutting pieces of solder of suitable lengths, and rocking members for receiving said cut pieces and shaping them for the seams of the vessel, substantially as described.

4. A solder-feeding mechanism comprising means for cutting solder in varying lengths in accordance with the size of the vessel to be soldered, and segments for receiving said solder and flattening it so that it can be readily applied to such vessels, substantially as described.

5. A soldering mechanism comprising mechanism for delivering pieces of solder of suitable lengths, means for straightening said pieces of solder, and means for further shaping the same for application to a vessel, substantially as described.

6. A solder-preparing mechanism comprising means for feeding the solder and means for cutting the same in suitable lengths, means for straightening the solder thus cut, and means for flattening and delivering the cut and straightened pieces to the seams of a vessel to be soldered, substantially as described.

7. A mechanism for preparing solder for soldering vessels comprising feed-rolls for delivering solder in stick or wire form to the machine, means for severing pieces of solder from such sticks or wire, flattening members for receiving and operating upon said pieces, and means for regulating the feed-rolls in accordance with the size of the can to be operated upon, substantially as described.

8. A solder-preparing mechanism comprising feed-rolls for delivering pieces of solder to the machine, flattening members for engaging said pieces, means for rocking said members, and means for imparting motion to the feed-rolls from the said rocking rolls, substantially as described.

9. A solder-preparing mechanism comprising feed-rolls for delivering pieces of solder to the machine, flattening members for operating upon the same, a friction-disk carried by the shaft of one of said members and engaging the face of one of said feed-rolls, and means for imparting motion in one direction only to the said disk, and feed-rolls over the said flattening-roll shafts, substantially as described.

10. A solder-preparing mechanism comprising feed-rolls for delivering pieces of solder to a machine, rocking flattening-segments for receiving and operating on said pieces of solder, a friction-disk adjustably mounted on the shaft of one of said rocking segments, frictional means carried by its periphery for engaging and actuating one of the feed-rolls, and a ratchet mechanism for causing the said friction-disk to receive movement only when the shaft of the flattening-segment is moving in one direction, substantially as described.

11. A solder-preparing mechanism for soldering vessels, comprising means for delivering suitable pieces of solder, rocking segments for receiving the same, means for causing the two segments to operate simultaneously, and a cam mechanism for rocking one of said segments, substantially as described.

12. A solder-preparing mechanism comprising means for feeding pieces of solder, rocking segments for receiving said pieces and flattening the same between them, an arm carried by one of said segments, a grooved cam for positively moving said arm back and forth, and means for communicating motion from one segment to the other, substantially as described.

13. A solder-preparing mechanism comprising means for feeding pieces of solder, rocking segments mounted in the machine, intermeshing gears carried by the shafts of said segments for causing one to move in correspondence with the other, and means for rocking one of said segments, whereby both will be caused to act upon the solder for flattening the same, substantially as described.

14. A solder-preparing mechanism comprising means for feeding pieces of solder, means for straightening the said pieces comprising a pressure-plate and a slide-plate, rolls for receiving the solder, and means for operating the guide-plate in correspondence with the movement of the segments so that the straight solder will be delivered to the segments, substantially as described.

15. A solder-preparing mechanism comprising means for delivering pieces of solder into the machine, means for rolling said pieces laterally to straighten them, and means for further shaping the said solder for application to vessels, substantially as described.

16. Means for preparing solder for soldering vessels, comprising mechanism for delivering pieces of solder into the machine, plates for clamping the solder and straightening the same, and means for further acting upon the solder to shape it for use, substantially as described.

17. A solder-preparing mechanism comprising a feed mechanism, a knife for cutting off suitable pieces of solder, means for rolling the solder laterally to straighten it and mechanism for shaping the solder to prepare it for use, substantially as described.

18. A solder-preparing mechanism comprising feeding means, a reciprocating knife for cutting off the solder in suitable lengths, segments for shaping the said solder, and means for operating said knife in accordance with the movement of the rolls, substantially as described.

19. A solder-preparing mechanism comprising feeding means, a reciprocating knife for cutting the solder in suitable lengths, a pressure-plate carried by the said knife and a slide-plate for supporting the solder beneath said pressure-plate, and means for moving the slide-plate so as to roll and straighten the pieces of solder together with means for further shaping the solder, substantially as described.

20. A solder-preparing mechanism comprising a feed mechanism and a flattening mechanism, means for cutting the solder in suitable lengths comprising a knife and mechanism for reciprocating the same, means for straightening the solder comprising a spring-pressed plate carried by the said knife, and a slide-plate below said knife-plate, the said slide-plate being operated by the flattening mechanism for straightening and delivering the solder to said flattening mechanism, substantially as described.

21. A solder-preparing mechanism comprising a feeding device, flattening-segments mounted therein, a reciprocating knife for cutting the solder in suitable lengths, mechanism operated by the shaft of one of said segments for reciprocating the knife, and mechanism also operated by the said shaft for controlling the feed mechanism, substantially as described.

22. A solder-preparing mechanism comprising a feeding device and flattening-segments, a reciprocating knife for cutting off suitable lengths of solder, a cam carried by the shaft of one of said segments, and a lever operated thereby for reciprocating the knife, substantially as described.

23. A solder-preparing mechanism comprising a feeding mechanism, rocking segments mounted in the machine, means for rocking said segments for flattening solder delivered to them, means for receiving the flattened solder, and means for delivering the solder upon the seam of a vessel, substantially as described.

24. A solder-preparing mechanism comprising means for flattening pieces of solder, a mechanism for receiving said flattened pieces and supporting the same so that it may be inserted between the edges of a vessel-blank to secure the same together, substantially as described.

25. A solder-preparing mechanism, comprising means for suitably shaping the pieces of solder, a delivering-trough for receiving the same having a slot extending from end to end, a vessel-carrying mechanism passing beneath the said trough, and a projection upon such mechanism for engaging the end of the solder and removing it from said trough to a position upon the vessel-blank, substantially as described.

In testimony whereof I hereunto affix my signature in presence of two witnesses.

WILLIAM RUBIN.

Witnesses:
FRANK R. JOHNSON,
JOSEPH F. MURPHY.